United States Patent [19]
Chester

[11] Patent Number: 5,519,732
[45] Date of Patent: May 21, 1996

[54] DIGITAL BASEBAND TO IF CONVERSION IN CELLULAR BASE STATIONS

[75] Inventor: David B. Chester, Palm Bay, Fla.

[73] Assignee: Harris Corporation, Melbourne, Fla.

[21] Appl. No.: 235,979

[22] Filed: May 2, 1994

[51] Int. Cl.$^6$ ................................................ H04L 27/04
[52] U.S. Cl. .................. 375/295; 375/298; 375/302; 375/377; 370/120; 370/122; 370/72; 348/388; 332/103; 455/103; 455/118
[58] Field of Search ........................ 375/259–261, 375/295, 296, 298, 302, 377; 370/12, 69.1, 120, 122, 123, 71, 72; 348/388, 423; 332/103–105; 455/103, 110, 118; 364/724.1

[56] References Cited

U.S. PATENT DOCUMENTS 5,289,464  2/1994  Wang ................................. 370/69.1
5,412,352  5/1995  Graham ............................... 332/103

Primary Examiner—Stephen Chin
Assistant Examiner—Amanda T. Le
Attorney, Agent, or Firm—Rogers & Killeen

[57] ABSTRACT

A system and method for converting and combining multiple digital baseband signals into a composite IF signal for subsequent up converting and transmitting as an RF signal. The system and method use distributed symmetrical circuit architecture to form a composite IF signal from multiple identical converting elements which are daisy chained together to produce the composite signal from the converted signals in each element. Circuit complexity is reduced by the use of the multiple identical elements each of which may be readily formed from a standard integrated circuit.

30 Claims, 4 Drawing Sheets

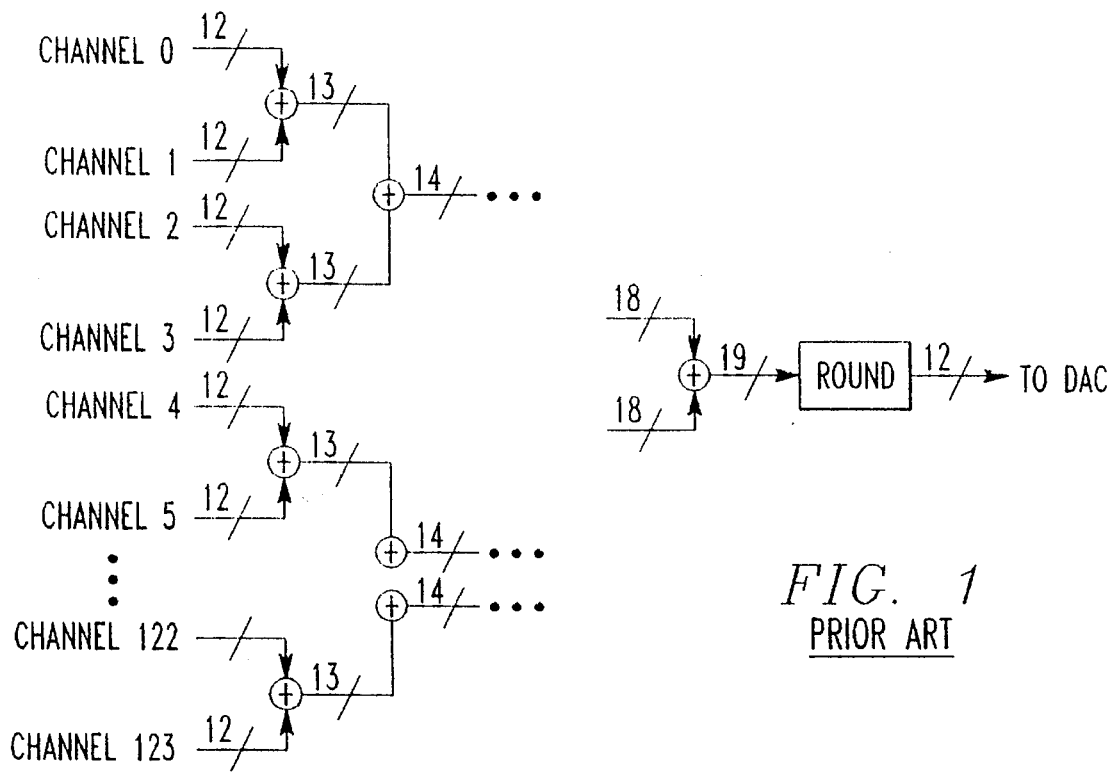
FIG. 1
PRIOR ART
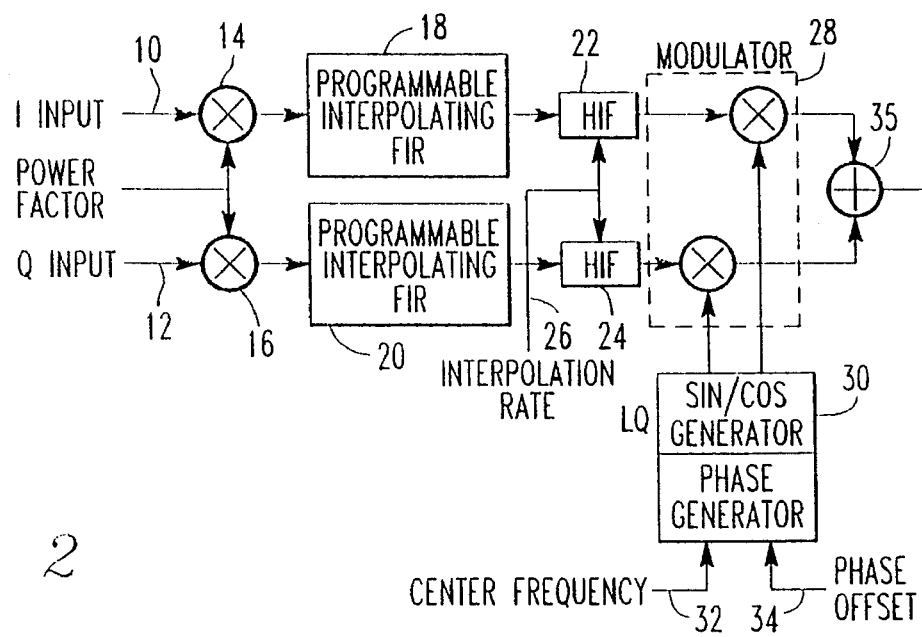
FIG. 2
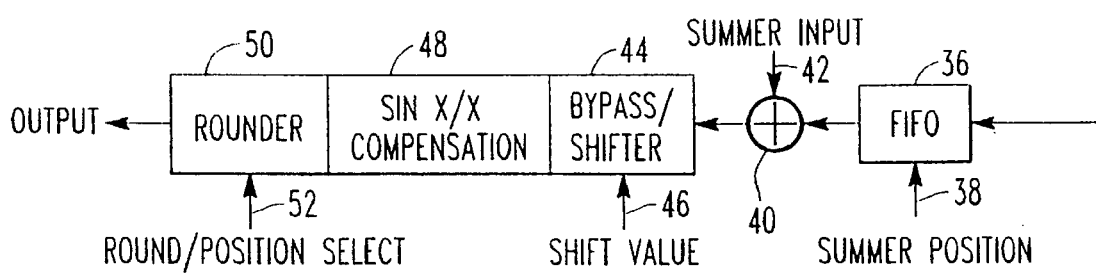

DIGITAL BASEBAND TO IF CONVERSION IN CELLULAR BASE STATIONS

BACKGROUND OF THE INVENTION

This application relates generally to systems and methods for combining two or more signals and particularly to systems and methods for converting multiple baseband sampled data streams into a frequency division multiplexed intermediate frequency (IF) signal ready to be converted to analog form in a typical RF communication system.

It is often desirable in communication systems to transmit a composite signal which is a combination of two or more data signals, combined in a predetermined manner. The data signals may represent voice communications, binary data communications, facsimile data, modem telecommunications, and similar baseband signals. For example, it is well known in the at to use time division multiplexing or frequency division multiplexing to generate a composite signal in which individual data signals are allocated a predetermined port,on of the time or frequency spectrum within the composite signal. A particular example of such a system is the transmit portion of a cellular base station. As is well known, the base station communicates both voice and data signals with plural remote stations simultaneously. To avoid interference between the various signals being transmitted to the mobile stations, the cellular base station communicates with each of the mobile stations using a separate RF carrier frequency. Typically, present base stations handle 100 to 300 mobile stations simulaneously.

One method to achieve such simultaneous transmission is to use separate transmitters for each signal to be transmitted, each transmitter being tuned to a predetermined frequency. Obviously, the use of a couple of hundred transmitters presents both space and cost problems. Accordingly, typical present cellular systems frequency multiplex the individual signals destined for the remote stations and broadcast only the composite signal. Each mobile station is then free to receive the composite signal and demodulate it to decode and use the signal present at the frequency then assigned to the particular mobile unit by the conventional cellular control system.

To a certain extent, conventional cellular base stations process the signals to be transmitted in parallel, each signal being modulated to a separate intermediate frequency ("IF"), each intermediate frequency being spaced in frequency from adjacent frequencies by the final desired frequency separation. After the individual signals are modulated up to the intermediate frequencies, the individual signals are combined into a composite IF signal which is then up converted (or modulated) to the desired radio frequency ("RF")and transmitted.

By way of an example, in one present system, each cellular base station transmits 124 signals (or "channels") simultaneously. Each channel is 180 KHz wide on center frequencies separated by 200 KHz. The RF band used for transmission of the composite signal is from 935 MHz to 960 MHz. In such a system, it is possible to use a 20 MHz composite IF center frequency. Under this condition, the first (lowest frequency) baseband channel would be up converted to a 7.7 MHz center IF frequency. The second baseband channel would be up converted to a 7.9 MHz center IF frequency. The last baseband channel would be up converted to a 32.3 MHz center IF frequency. The individual IF channels are then summed and the composite signal is up converted to a 947.5 MHz center frequency for transmission by convention RF transmission equipment.

In known cellular communications systems, the baseband data is generally in digital format, often but not necessarily the result of a digital sampling of a voice or data communication. Some prior art cellular base stations convert the individual digital data signals to an analog format. Often conversion is done in a digital baseband processor which modulates each digital modulating signal by the digital data signal and supplies each of the modulated signals to individual digital-to-analog converters ("DAC") and filtered. Each of the individual analog signals is then up converted to its assigned IF frequency and subsequently summed with the other 123 channels (which have undergone the same process in parallel). The composite signal may then be modulated to the desired RF frequency for subsequent transmission. Note that the prior art analog method requires 124 separate DACs, smoothing filters, and up converters. In addition, the prior art analog method requires a very complicated 124 input analog summing tree.

It is known in the prior art analog methods to reduce the number of analog signal required by combining multiple digital modulated channels in the baseband processor. However, even with such a reduction, prior art analog systems are often considered difficult and costly to implement particularly in cellular base stations in which component and system performance is tightly specified. To achieve the tight specifications, such prior art systems have to be rigorously designed and manufactured to reduce the effect of spurious signals generated by each of the DACs and, in general, by each analog step in the system.

Accordingly, it is known to use digital signal processing techniques to circumvent many of the problems associated with analog signal processing systems. In a digital signal processing system, the individual data signals, each digitally modulated to a separate IF frequency, are summed digitally and the composite signal thereby digitally generated. The composite digital signal may then be converted to an analog signal, modulated to an RF signal, amplified and transmitted. Typically, in such digital systems, each of the individual modulated signals is digitally sampled at the same sampling rate and at a rate which is consistent with the Nyquist sampling rate for the expected composite signal. So long as the sampling rate criteria have been met, the individual signals may be passed to a digital summing tree for combining into the composite signal. If a digital equivalent to the analog implementation is used, a system structure such as shown in summing tree of FIG. 1 may result.

With reference to a typical digital summing tree as shown in FIG. 1, each channel has a predetermined precision, 12 bits in the system of FIG. 1. As the channels are added together by the adder, additional bits must be added to the circuit for each adder to retain the precision of the sum. For a 124 channel signal, a summing tree will generally require 7 layers, resulting in a 19 bit precision from the final adder in the tree. If desired, the composite signal from the final adder may by rounded to its most significant bits prior to converting to an analog signal. In practice, the circuit of FIG. 1 with the width of its adders growing for each level requires a relatively large amount of hardware to implement. In addition, some of the precision of the prior art circuit is lost if not all the channels are active and the rounder circuit automatically lops off the least significant bits of the composite signal.

It is therefore an object of the present invention to provide a novel system and method for combining digital signals with a reduced complexity in comparison to prior art systems.

It is yet another object of the present invention to provide a novel system and method in which multiple communication signals may be combined without a loss of precision.

It is still a further object of the present invention to provide a novel system and method in which multiple signals may be combined by repeated use of similar components.

These and many other objects and advantages of the present invention will be readily apparent to one skilled in the art to which the invention pertains from a perusal of the claims, the appended drawings, and the following detailed description of preferred embodiments.

BRIEF DESCRIPTION OF THE DRAWINGS

FIG. 1 is a partial functional block diagram illustrating the combining of digital signals in a prior art system.

FIG. 2 is a simplified block diagram of an interpolating up converter of the present invention.

DESCRIPTION OF PREFERRED EMBODIMENTS

Figure 3:
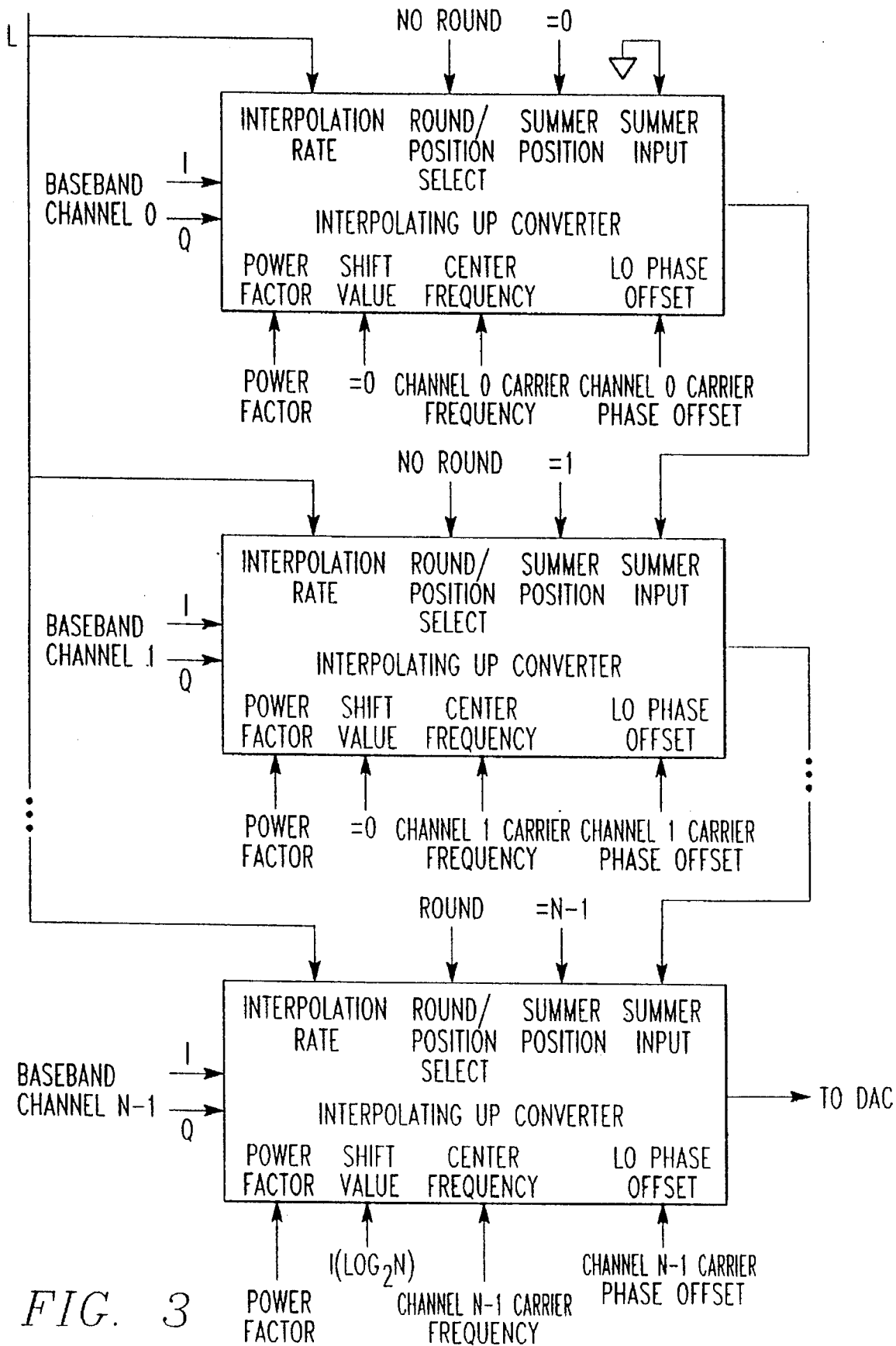
FIG. 3 is a simplified block diagram of a signal summing circuit using repeated interpolating converters of FIG. 2 in accordance with the present invention.

With reference to FIG. 2, an interpolating up converter of the present invention may have two input terminals, 10 and 12, to receive a baseband quadrature signal (I Input, Q Input). The quadrature signal may be power factor adjusted by adjustable multipliers 14, 16. Each of the components of the quadrature signal may then be input to programmable Finite Impulse Response filters ("FIR") 18, 20 and subsequently to high interpolation filters ("HIF") 22, 24. Together, the series of the FIR and HIF interpolate (i.e., change the sampling rate) of the quadrature signal components as specified by an interpolation rate input 26. The interpolated signal components may then be modulated by a modulator 28 which multiplies each of the interpolated component signals by signals which are offset from each other by ninety degrees. The offset signals may be derived from a digital signal synthesizer 30 which generates desired sine and cosine signals upon input of a desired center frequency 32 and phase offset 34. The multiplied component signals may be added by an adder 35 to produce an individual IF signal.

In operation, a baseband quadrature modulated signal representing the digital data associated with one of the channels in a multiple channel system may be provided to the input terminals 10, 12. The series of FIRs 18, 20 and HIFs 22, 24 interpolate the sampling rate of the input signals to the desired sampling rate for the composite signal. When subsequently multiplied by the sine/cosine signals in the modulator 28 and summed by the adder 35, the signal output from the adder 35 has been up converted to an intermediate frequency (dependent in frequency and phase upon the specified center frequency signal 32 and phase offset signal 34) and interpolated to achieve a sampling rate which is compatible with the sampling rate of other individual signals to be subsequently combined and the expected composite signal.

The power factor multipliers 14, 16 operate to scale the input to control the power ultimately delivered to the RF output by each input channel.

With continued reference to FIG. 2 and by way of example, the quadrature signal input to the converter may be sampled consistent with its Nyquist rate. In a typical present cellular system, the individual channels are sampled at 270,833 kilosamples per second ("KSPS"). If a composite IF center frequency of 20 MHz is desired, the highest frequency IF channel in a 124 channel system will have a frequency of 32.4 MHz. If it is desired to sample the composite IF signal at 2.5 times its highest frequency, a sampling rate of 81.25 million samples per second ("MSPS") is required. Thus, the interpolation rate signal 26 will be set to 300 (i.e, 81.25 MSPS divided by 270.833 KSPS). To generate the desired intermediate frequency signals in this example, the center frequency 32 for the first (lowest frequency) converter is set to 7.7 MHz, and to 7.9 MHz for the second converter, and so on for each converter. Thus, the signal which appears at the output of the adder 35 of the first converter will have a sampling rate of 81.25 MSPS and a center frequency of 7.7 MHz. As explained further below, this signal may be readily added to the signals from other channels which have been similarly generated to develop signals having a common sampling rate and individual center frequencies.

The FIR 18 may be a programmable interpolating FIR such as disclosed in R. E. Crochiere and L. R. Rabiner, Multirate Digital Signal Processing, Prentice-Hall, 1983. The HIF 22 may be a multiplier free high interpolation filter such as disclosed in E. B. Hogenauer, "An Economical Class of Digital Filters for Decimation and Interpolation,", IEEE Trans. on ASSP, Vol. AASP-29, No. 2, PP. 155–162, April 1981. The modulator 28, adder 35, and digital signal synthesizer 30 may be a conventional numeric controlled oscillator/modulator, such as the HSP45116 currently marketed by Harris Corporation, the assignee of the present application.

To facilitate the summing of the individual IF signals, the interpolating up converter of FIG. 2 may also include a FIFO shift register 36 which receives the signal output from the adder 35 and variably delays the signal in accordance with a summer position signal 38. The output of the FIFO shift register 36 may be added by a second adder 40 to another signal received at an input terminal 42 to the second adder 40. The output of the second adder 40 may be shifted in a variable shifter 44 under the control of a shift value signal 46 and subsequently predistorted by a compensator circuit 48 tom accommodate for biases and inaccuracies introduced by various circuit elements, particularly by a subsequent conversion from a digital signal to an analog signal. The predistorted signal may be rounded by a rounder 50 under the control of a round position select signal 52. The signal output from the rounder is a composite IF signal which may be converted to analog form by a digital to analog circuit (not shown) and transmitted by a conventional analog signal transmitting device (not shown).

The operation of the portion of the interpolating up converter after the adder 35 may best be described with reference to FIG. 3 in which multiple interpolating up converters of FIG. 2 may be used in a circuit as shown in FIG. 3. By interconnecting plural of the interpolating up converters and setting the various signals used by each of the interpolating up converters, multiple quadrature signals may be combined in a composite signal which can be converted to an analog signal and transmitted. For example, with reference to FIG. 3, the interpolating up converter fore. Channel 0 (i.e., the first, lowest frequency channel) receives a signal L indicating the interpolation rate desired for the system. Signals specifying the desired center frequency 32 and phase offset 34 of channel 0 may be applied to the up converter. The individual IF signals generated by each of the up converters are summed by chaining the output signal of each interpolating up converter to the summer input 42 of the next interpolating up converter in the chain of converters. Each interpolating up converter adds its individual IF signal to the partial sum of individual IF signals which has been passed through the chain to it and passes the resulting sum signal to the next interpolating up converter in the chain.

To ensure that the signals being added by the chained interpolating up converters are aligned in time, each of the interpolating up converters delays its individual IF signal by an amount related to the interpolating up converter's position in the chain of converters. Thus, the first converter does not delay its output at all, the second converter delays its output by one cycle so that it can be added to the output of the first converter, the third converter delays its output by two cycles so that it can be added to the output of the second converter, etc.

In other words, on a given output clock cycle, each interpolating up converter produces an output, $x_i(0)$, where i specifies the interpolating up converter which produced the sample. On the next output clock cycle, the interpolating up converters produce $x_i(1)$, etc. To produce a time aligned sum, all the $x_i(0)$s must be summed together, all of the $x_i(1)$s must be summed together, etc. Because of the chaining of the interpolating up converters, if there were no delay prior to the second adder 40, during the first cycle, $x_0(0)$ would be added to zero (for the first channel) to produce $x_0(0)$ on the next output clock cycle and this result passed to the second converter in the chain. However, without a delay at second converter, $x_1(1)$ would then be present at the second converter (instead of $x_1(0)$ as is required) and the sum would not be properly time aligned. By delaying the individual IF signal in the second converter, $x_1(0)$ is available for summing at the same time as the arrival of the $x_0(0)$ signal and the signals are time aligned. Each subsequent converter in the chain likewise delays its individual IF signal as determined by the serial position of the converter in the chain.

With reference to FIGS. 2 and 3, the summer position signal 38 indicates where in the chain the converter is located and controls the shifting of the FIFO shift register 36 to delay arrival of the individual IF signal sample into the second adder 40 to maintain time alignment of the summing process.

The width of the second adder 40 should be sufficient to carry the full precision of the summing process for a reasonable number of chained interpolating up converters. For example, if the individual IF signals are 12 bits wide, up to 256 converters may be chained together if the second adder 40 has a width of 20. Thus, the second adder 40 can have one input of width 12 (from the FIFO 38), the other input of width 20 and an output of width 20.

For each interpolating up converter, the full width of the output of the second adder 40 is passed to the next interpolating up converter 20, except for the final converter. The final converter in the chain passes the output signal from the second adder 40 through a series of post processing operations to prepare the output signal for conversion to analog form and transmission. With reference to FIGS. 2 and 3, in the first step of the post process, the output of the second adder 40 shifts the output sum to align the most significant bit ("MSB") of the summation process with the MSB of the final output. That is, the amount by which the output signal is shifted is a function of the number of signals present in the composite signal. For example, for a 20 bit adder having the capability of adding up to 256 individual IF signals, if only 65 to 128 signals are present, the output of the summation would necessarily be one bit less than the output MSB. If 33 to 64 signals were in the composite signal, the output of the second adder 40 would necessarily be two bits less than the output MSB. Accordingly, the shifter 44 would receive a signal from the shift value signal 46 to up shift the output of the second adder 40 by one bit and two bits, respectively for each situation.

The output of the shifter 44 may be modified by a compensator 48 to accommodate known and expected anomalies in the summation and conversions processes. For example, it is known that the digital-to-analog conversion of the composite signal will distort the signal in a (sin X)/X fashion. To compensate for this distortion and simplify the filtering needed after the DAC, the output may be predistorted by a fixed FIR filter having a X/(sin X) passband response.

The output of the compensation circuit 48 may be rounded by a rounder 50 under the control of a rounding signal 52 to reduce the number of bits of the output signal to a selectable number. Generally, neither the rounder 50, the compensator circuit 48 or the shifter 44 would be activated in interpolating up converters which are not last in the chain of converters. Accordingly, individual interpolating up converter circuits in accordance with the present invention may be constructed without these post processing features and the post processing performed by a separate circuit performing these functions as desired.

With reference to FIG. 3, it may be appreciated that use of the present invention permits a construction of a circuit which uses plural identical interpolating up converters interconnected in a daisy chain fashion to perform a complex signal modulating and compositing function. The flexibility of the interpolating up converters of the present invention to accommodate varying IF frequencies and interpolation rates facilitates the use of integrated circuit technology to produce a standard circuit which can be readily interconnected in a simple fashion to produce a complex multiple signal conversion and compositing.

Figure 4:
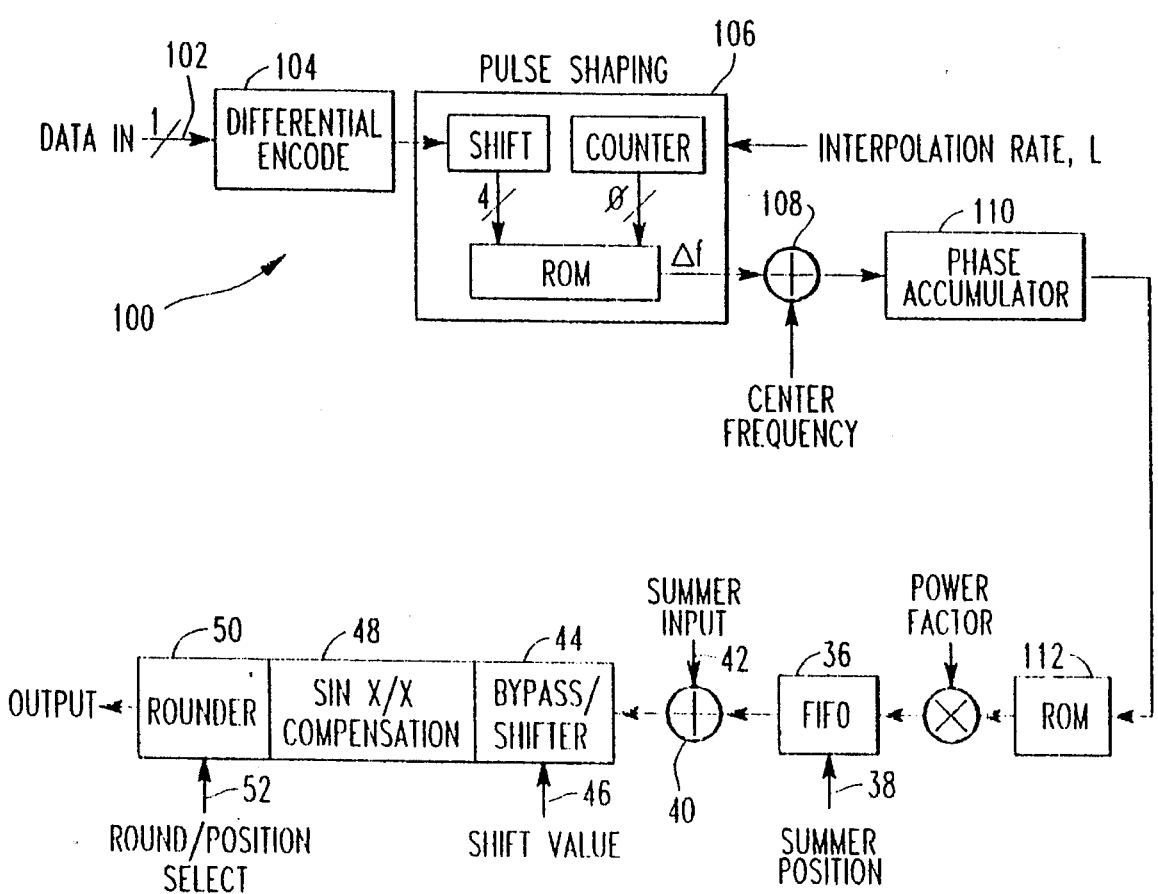
FIG. 4 is a simplified block diagram of a modulating up converter of the present invention.

With reference now to FIG. 4, a function similar to the interpolating up converter may be performed by a modulating up converter 100 in which data to, be transmitted is received at an input terminal 102. The input data may be encoded by a differential encoder 104 and the resulting single bit data stream passed to an interpolating pulse shaping filter 106. The output signal from the shaping filter 106 is a phase step corresponding to a frequency deviation from center IF frequency for the particular channel. An adder 108 then adds the phase step corresponding to the data to the fixed phase step corresponding to the selected center IF frequency and the result is passed to a phase accumulator 110. The phase accumulator 110 generates the address of a sinusoidal ROM 112 which outputs an IF wave form, corresponding to the individual IF signal of the embodiment of FIGS. 2 and 3.

The circuit features downstream of the sinusoidal ROM 112 in the modulating up converter have the same function as the corresponding features of the interpolating up converter of FIGS. 2 and 3.

The data input into the modulating up converter may be unmodulated data. The data is differentially encoded by the encoder 104, i.e., interbit transitions are encoded as a binary 1 and non-transitions are Coded as a binary 0.

The pulse shaping filter 106 may include a ROM based polyphase interpolator using four taps per phase. This filter can be readily implemented in ROM because the data into the shaping filter 106 is 1 bit wide. Each ROM address stores a rounded version of the resulting sum of products for a given state of the data delay register and phase of the polyphase filter. As a result of the operation of the pulse shaping filter 106, the data signal also has a sampling rate consistent with the other signals to be combined and with the Nyquist requirements of the composite signal to be developed.

Figure 5:
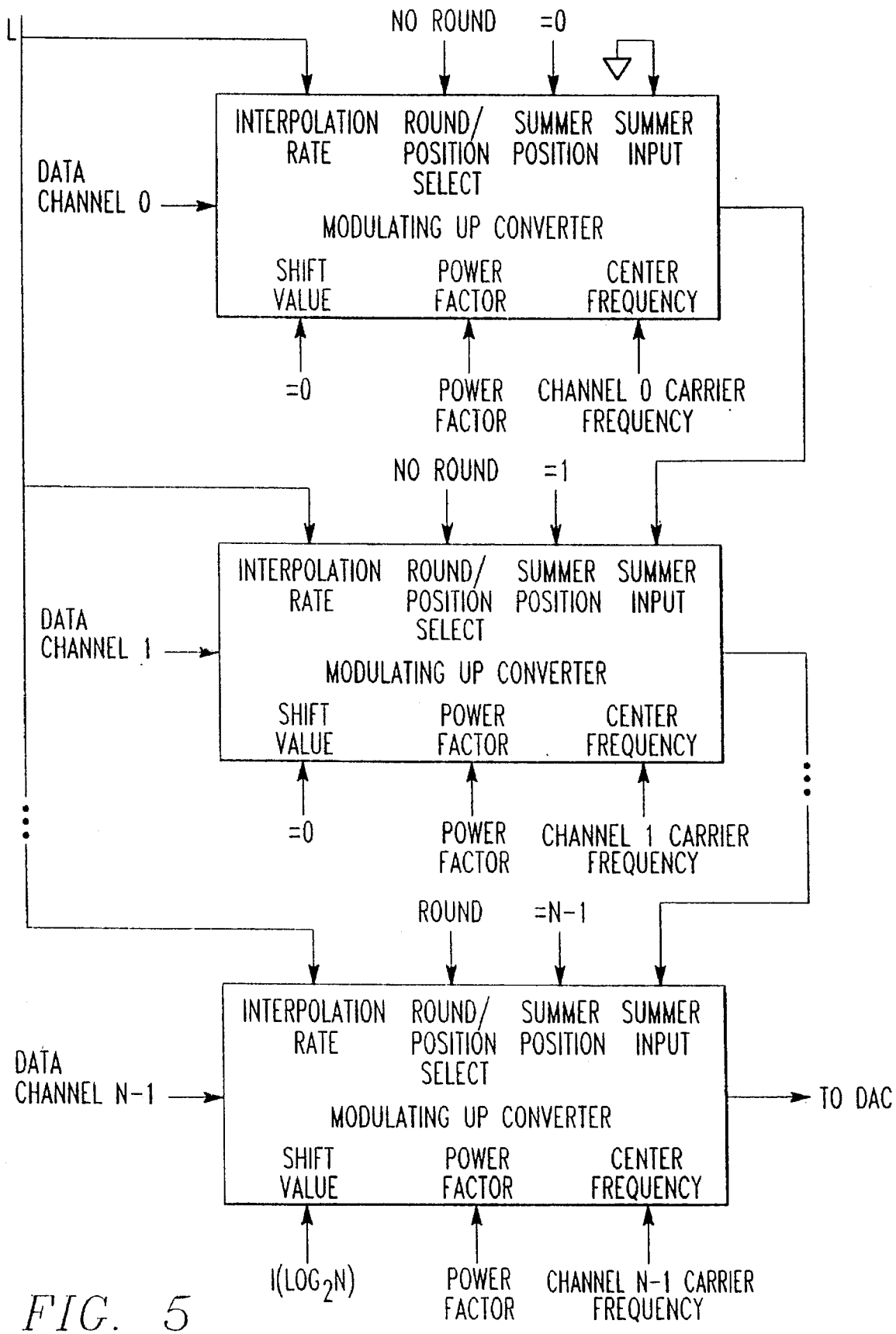
FIG. 5 is a simplified block diagram of a signal summing circuit using repeated modulating converters of FIG. 4 in accordance with the present invention.

In operation, each channel of the communication system may be input into one of a series of daisy chained modulating up converters in a fashion similar to that of the system of FIG. 3. In particular, and with reference to FIGS. 4 and 5, plural modulating up converters may be daisy chained so that the individual IF signal generated by each converter is added to the sum of the individual IF signals from all the up converters earlier in the chain of converters and the signal output from the final up converter of the chain is post-processed by the shifter, compensator and rounder circuits. Thus, the multiple modulating up converters may be daisy chained to form a composite digital IF signal.

While preferred embodiments of the present invention have been described, it is to be understood that the embodiments described are illustrative only and the scope of the invention is to be defined solely by the appended claims when accorded a full range of equivalence, many variations and modifications naturally occurring to those skilled in the art from a perusal hereof.

What is claimed is:

1. A method of transmitting plural voice or data communications, comprising the steps of:
   a. providing a first plurality of digital baseband quadrature signals, each signal representing a voice or data communication;
   b. digitally interpolating each of the baseband quadrature signals at a rate related to a desired intermediate frequency selected with relation to the frequency of a desired composite IF signal;
   c. digitally modulating each of the interpolated signals by one of a first plurality of desired carrier channel frequency signals to provide a first plurality of individual IF signals;
   d. variably time delaying each of the individual IF signals;
   e. summing the time delayed individual IF signals so that the composite IF signal at a sampling time represents the sum of the individual signals at the said sampling time;
   f. shifting said summed IF signal by an amount representative of the number of baseband quadrature signals present in the summed signal;
   g. predistortion filtering said shifted IF signal;
   h. rounding said predistorted IF signal to a predetermined number of binary bits; and,
   i. converting said rounded IF signal to an analog signal for transmission.

2. The method of claim 1 wherein the power of each of the baseband quadrature signals is adjusted by means of a power factor multiplier.

3. The method of claim 1 wherein the digital interpolation is performed by a circuit comprising a finite impulse response filter.

4. The method of claim 3 wherein the digital interpolation is performed by a circuit comprising a multiplier free high interpolation filter.

5. The method of claim 1 wherein the digital modulating is performed by a circuit comprising a digital sin/cosine generator.

6. The method of claim 1 wherein the predistortion is related to the inverse of the distortion caused by the converting of the rounded IF signal to an analog signal.

7. The method of claim 6 wherein the predistortion is a function of X/(sin X).

8. The method of claim 1 wherein the variable time delaying is performed by a circuit comprising a FIFO shift register.

9. A method of transmitting plural channels of information, comprising the steps of:
   a. providing plural sources of information;
   b. digitally encoding each of said plural sources of information to provide plural digital signals;
   c. modulating each of said digital signals to provide plural digital baseband quadrature signals;
   d. interpolating each of said modulated digital signals using a finite impulse response filter;
   e. modulating each interpolated digital signal to provide plural individual IF signals;
   f. summing the plural individual IF signals; and,
   g. adjusting the summed IF signals to compensate for the number of individual signals.

10. The method of claim 9 further comprising the steps of:
    h. adjusting the power of the plural digital baseband quadrature signals;
    i. variably delaying the plural individual IF signals;
    j. converting the adjusted summed IF signal from digital to analog; and,
    k. predistorting the adjusted summed RF signal to compensate for distortions in the conversion from digital to analog.

11. The method of claim 9 wherein the interpolation is performed by a circuit comprising a finite impulse response filter and a high interpolation filter.

12. The method of claim 9 wherein the adjusted summed IF signal is rounded to a predetermined precision.

13. The method of claim 10 wherein the predistorting is in the form of X/(sin X).

14. A circuit for transmitting plural channels of information, comprising:
    plural interpolating up converters, each said converter comprising:
        input terminals to receive one set of said baseband quadrature signals;
        an interpolating finite impulse response filter and a high interpolating filter to interpolate the baseband quadrature signals at a selective rate;
        a sine/cosine generator to generate digital sine and cosine signals at a selective frequency and phase;
        a modulator to modulate said digital sine and cosine signals and said interpolated baseband quadrature signals to provide an individual IF signal;
        a variable delay circuit to selectively delay the individual IF signal;
        an output terminal to output the variably delayed individual IF signal; and,
        a summing device for digitally summing the delayed individual IF signal with an external digital signal to provide a digital sum signal; and,
        an output terminal for the digital sum signal;
    an interconnection circuit connecting the interpolating up converters serially so that the digital sum signal of a first connected up converter is provided to the summing device of the next connected up converter and so that the digital sum signal of the last connected up converter is a composite signal of the delayed individual IF signals.

15. The circuit of claim 14 further comprising a shifter to shift the composite signal as a function of the number of individual IF signals included in said composite signal.

16. The circuit of claim 15 further comprising a predistortion circuit for selectively predistorting said composite signal.

17. The circuit of claim 16 further comprising a rounder for rounding off said predistorted composite signal to a selective accuracy.

18. The circuit of claim 16 wherein said predistortion circuit predistorts as a function of X/(sin X).

19. The circuit of claim 16 where said predistortion circuit comprises a finite impulse response filter.

20. A method of transmitting plural data signals comprising the steps of:
  a. providing plural digital data signals;
  b. encoding each of said digital data signal to provide a like plurality of encoded digital signals;
  c. interpolating each of the encoded digital signals to provide a plurality of digital phase step signals having a selective sampling period;
  d. adding to each digital phase signal a signal representing the phase change of selective carrier signals during successive periods of said selective sampling periods;
  e. accumulating the added signals to provide plural phase accumulation signals;
  f. using the phase accumulation signals to generate plural individual IF signals related to the phase accumulation signals;
  g. variably time delaying each of the individual IF signals;
  h. summing the time delayed individual IF signals so that the composite IF signal at a sampling time represents the sum of the individual signals at the said sampling time;
  i. shifting said summed IF signal by an amount representative of the number of data signals present in the summed signal;
  j. predistorting said shifted IF signal;
  k. rounding said predistorted IF signal to a predetermined number of binary bits; and,
  l. converting said rounded IF signal to an analog signal for transmission.

21. The method of claim 20 wherein said interpolating is performed by a circuit comprising a pulse shaping filter.

22. The method of claim 21 wherein said pulse shaping filter comprises a shift register, a counter and a memory.

23. The method of claim 22 wherein said memory contains signals representing the states of the filter for selective states of the shift register and counter.

24. The method of claim 20 further comprising the step of:
  m. adjusting the power of the individual IF signals.

25. A circuit for simultaneously transmitting plural signals, comprising:
  plural modulator up converters, each converter comprising:
    an input terminal for receiving a data signal;
    an encoder for encoding the received data signal;
    an interpolator for interpolating at a selective rate the encoded data signal;
    a center frequency generator to provide a digital signal representing a desired IF center frequency signal;
    an adder for adding the encoded data signal to the digital sample of the desired IF center frequency signal;
    an phase accumulator for accumulating a signal representing the total phase of the added signals;
    a sinusoidal generator for providing an individual IF signal in the form of a sinusoidal signal related to the total phase signal;
    a variable delay circuit to selectively delay the individual IF signal; and,
    a summer for digitally adding the delayed individual IF signal to another signal to provide a partial sum signal; and,
    an interconnection circuit connecting the modulating up converters serially so that the partial sum signal of a first connected up converter is provided to the summer of the next connected up converter and so that the partial sum signal of the last connected up converter is a composite signal of the individual IF signals.

26. The circuit of claim 25 further comprising a shifter to shift the composite signal as a function of the number of individual IF signals included in said composite signal.

27. The circuit of claim 25 further comprising a predistortion circuit for selective predistorting said composite signal.

28. The circuit of claim 26 further comprising a rounder for rounding off said predistorted composite signal to a selected accuracy.

29. The circuit of claim 27 wherein said predistortion circuit predistorts as a function of X / (sin X).

30. The circuit of claim 29 wherein said predistortion circuit comprises a finite impulse response filter.

* * * * *